Aug. 21, 1945.   P. F. McDERMOTT   2,383,066
FILTER UNIT AND METHOD OF MAKING THE SAME
Filed March 25, 1943
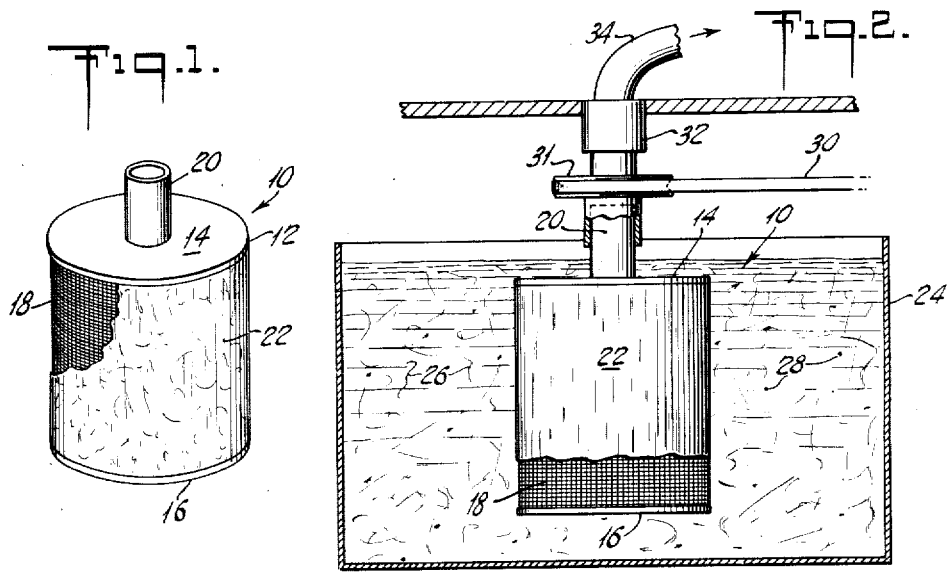
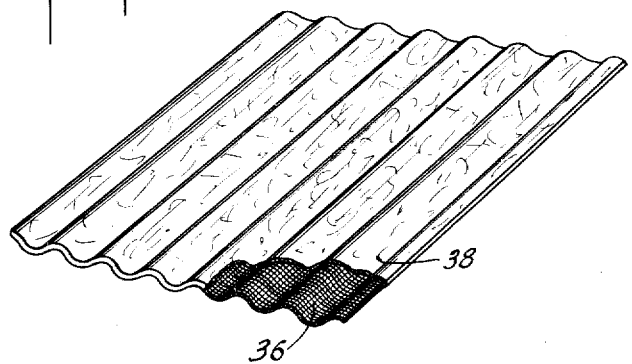
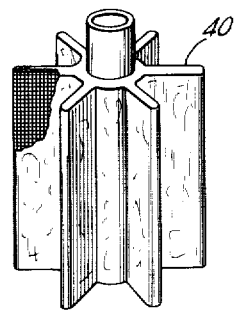
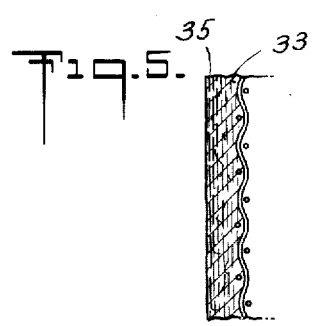
INVENTOR
PAUL F. McDERMOTT.
BY Virgil C. Kline
ATTORNEY Patented Aug. 21, 1945

2,383,066

UNITED STATES PATENT OFFICE 2,383,066

FILTER UNIT AND METHOD OF MAKING THE SAME

Paul F. McDermott, Martinsville, N. J., assignor to Johns-Manville, Corporation, New York, N. Y., a corporation of New York Application March 25, 1943, Serial No. 480,467

5 Claims. (Cl. 183—44)

The present invention relates to filters for the removal of solid or liquid particulate matter such as dust, dirt, smoke, tars, oils, etc., from air and other gases. Filter units in accordance with the invention are adapted for industrial uses, air conditioning apparatus, respirators and the like, the invention not being restricted to any particular application.

The principal object of the invention is the provision of a filter and a method of making the same, the filter including a continuous interfelted layer of fibrous material closely overlying and supported by a foraminous member or form and of character to secure substantially complete removal of gas-borne particulate materials for relatively long periods.

More particularly an object of the invention is the provision of a filter unit having low flow resistance and composed, at least for the most part, of interfelted inorganic fibers such as mineral wool fibers, with a relatively small proportion of a binding material disseminated throughout the felt.

Another object of the invention is the provision of a filter unit in which the fibrous filtering layer overlying the foraminous supporting member is felted in situ, to closely conform with and follow the surface contours of the supporting member and to provide a continuous uninterrupted layer. The filtering layer may be applied to supporting members of cup shape or of any desired configuration.

A still further object of the invention is the provision of a filtering unit or element and a method of making the same, whereby fibers and a suitable binder are deposited directly from a liquid dispersion thereof onto the surface of a matrix comprising the supporting member. As stated above, preferably the fibers comprise mineral wool fibers, by which term is meant fibers formed of rock, slag, glass, and other similar materials. However, the mineral wool fibers may be interpersed, if desired, with organic or other fibers.

A still further object of the invention is the provision of a method of wet felting fibrous materials directly onto the surface of a foraminous matrix, in which the fibers assume positions generally parallel to the face of the matrix.

My invention will be more fully understood and further objects and advantages thereof will become apparent when reference is made to the more detailed description thereof which is to follow and to the accompanying drawing, in which;

Fig. 1 is a perspective view, with parts broken away for clearness of illustration, depicting a tubular filtering element in accordance with the invention;

Fig. 2 is a diagrammatic view illustrating a method of making the element of Fig. 1;

Fig. 3 is a perspective view similar to Fig. 1 of a modified form of filter unit;

Fig. 4 is a perspective view similar to Fig. 1, of a further form of the invention; and Fig. 5 is a detail sectional view on an enlarged scale illustrating a modification of the invention which may be employed with any of the constructions of Figs. 1, 3 and 4.

Referring now particularly to Fig. 1, there is shown a filter unit 10 comprising a cylindrical hollow body member 12 including end members 14 and 16 and a foraminous wall 18. One of the end members, for example, end member 14, includes a nipple 20, secured thereto and communicating with the interior of the hollow body 12. End members 14 and 16 may be formed of any suitable substantially gas-impervious material such as sheet metal, wood, plastic or the like. The material forming the foraminous wall 18 may be a relatively fine mesh screen or perforated sheet of metal, plastic or other suitable material providing sufficient rigidity to support the filtering layer during its formation and to retain the shape of the body under service conditions. The end members may be crimped, soldered or otherwise secured to the foraminous wall.

Overlying wall 18 is a filtering layer or mat 22 comprising interfelted fibers with a binder in limited quantities dispersed throughout the felt. The filtering layer is of substantially uniform density and thickness throughout the foraminous wall area of the body completely covering and closely conforming to the surface contours of the same. The fibrous layer is interlocked to the foraminous material, at least to some extent, by penetration of the fibers through the numerous openings. If desired, foraminous material may be used in place of one or both of the imperforate end members, in which event the fibrous filtering layer is extended to cover these areas.

Referring now to Fig. 2, the method of forming the filtering layer will be described. The interior of body 12 is connected through nipple 20 to any suitable source of suction. The body is supported by suitable means in a vat 24 containing a furnish comprising a liquid dispersion of fibers 26 and of binder 28, the latter in finely divided form. For the purposes of example, and without limiting the invention, it may be stated that a suitable furnish for this purpose comprises 0.11 part of fibers and 0.004 part of binder, well dispersed in 60 parts of water, all proportions by weight.

When the body is immersed in the furnish, the suction line 34 is opened to cause flow of liquid through the foraminous wall which serves as a matrix against which the fibers are deposited in interfelted relationship with the binder particles dispersed throughout the felted layer. The initially deposited fibers lie closely adjacent the foraminous wall and, in many instances, ends of the fibers penetrate the openings to, in effect, interlock the felted layer to the wall. The felting action is continued, with such continuous or intermittent replenishment of the furnish as may be necessary, until the felted layer is built up to the desired thickness.

Although the use of suction to cause flow of the furnish to the matrix has been described, other means may be employed for providing a pressure differential across the matrix. For example, pressure may be applied to the furnish and line 34 be opened to the atmosphere.

To promote uniformity of the fibrous felt or mat over the matrix and also to obtain a preferred fiber arrangement in which the fibers lie substantially parallel to the face of the matrix, relative motion may be produced between the furnish and the matrix. This may be accomplished, as illustrated in Fig. 2, by rotating the matrix slowly in the vat 24 by means of a drive 30 connected to any motive source. In this case a rotary seal 32 is provided between the stationary vacuum line 34 and a relatively rotatable section carrying a drive pulley 31 and connected to nipple 29. On the other hand, the vat may be rotated if desired and the matrix and vacuum line held stationary. Similar effects may be obtained by reciprocating motion of the matrix in the vat. Relative rotary motion will tend to lay the fibers parallel to the face of the matrix and extending circumferentially thereof. Reciprocating movement will tend to lay the fibers generally parallel to the face of the matrix but extending axially thereof. Combinations of the above or other movements of the matrix or vat may be employed to obtain any desired arrangement of the fibers.

When the fibrous mat is built up on the matrix to the desired thickness, the matrix is removed from the furnish and preferably the withdrawal of air continued for a short time to remove excess moisture from the mat. The completed filter unit is then placed in an oven and thoroughly dried.

The wet felting of the fibrous layer directly upon the matrix, the latter constituting the supporting body of the filtering element, covers all or practically all of the foraminous area with a substantially uniform layer of the felted filtering mat. In some instances it has been determined that minor voids are formed particularly adjacent the end caps of the hollow body. These may readily be sealed to prevent leakage by the use of any suitable or conventional sealing material, for example, ethyl acetate, latex, asphaltic materials and the like, such materials having the further function of providing an additional mechanical support for the filtering mat.

The particular binders employed for the fibrous mat and the proportions used are not critical. An alkyd resin has been found particularly suitable for this purpose, but many other binders, both organic and inorganic, may be employed For example, other synthetic and natural resinous materials may be used as well as materials such as starch, latex, asphalt, waxes, and the like, the various materials serving, in addition to their usual binding function, to lend various characteristics to the mat. Mixtures of the various binders may be employed. The binders may be added to the furnish in any suitable form such as fibres, crystals, liquids, suspensions, emulsions, etc. Where the filter is to be employed under high temperature conditions, an inorganic binder such as bentonite is of particular advantage. The binder may be one which is self-setting, such as the alkyd resin referred to, or it may require further setting treatments. Thus, for example, if one of the heat setting binders is employed, the drying step may be carried out at a temperature sufficiently high to cause setting of the binder. If a binder such as bentonite is used, the filter is subjected to firing temperatures, say, of 1200° F.

The proportion of the binder may vary widely depending upon the purpose for which the filter is to be used. In any event the binder should not be present in sufficient amount to increase the flow resistance of the filter to an undesirable extent. In the example given above, the binder in the stated proportion causes little increase in the flow resistance of the filter, but adequately binds the fibers in the felted mat.

The size and character of the fibers may also vary depending upon the particular qualities desired. Where the filter is to be employed to remove fine particles, fine mineral wool fibers are used. Thus, fibers of a diameter averaging between 4 and 6 microns have beeen found to provide a filter which will remove from 99.5% to 99.7% of substantially uniform size particles of about 0.03 micron radius at a concentration of approximately 50 milligrams per cubic meter of air. The air flow was at the rate of 32 meters per minute and the unit had a filter area of about 27 square inches.

Mineral wool fibers are preferred for the fibrous filtering layer but they may, if desired, be intermixed with other fibers such as different grades of asbestos fiber, sulphite pulp, cotton pulp, jute and manila pulps and the like.

Where the air or other gas passing through the filter carries both coarse and fine particles, the filtering layer or mat may comprise layers of fibers of different size or character. As shown in Fig. 5, for example, a layer 33 of fibers adjacent the matrix or foraminous wall may be of relatively fine fibers, providing minute interstices for the entrapment and removal of fine particles, and an outer layer 35 overlying and substantially interfelted with the inner layer may be of relatively coarse fibers to entrap and remove relatively larger particles and thus prolong the life and increase the efficiency of the filter unit. The second layer is preferably deposited similarly as the first, the furnish being changed or the matrix removed to a second vat to apply the second layer. It will be understood that as many different interfelted layers of fibers of different character may be employed as desired.

Referring now to Fig. 3, a modification of the form of the filtering unit is shown. In this instance the supporting member comprises a corrugated screen or perforated element 36 onto which the filter mat 38 is deposited. The method of forming the mat is similar to that previously described, except that the foraminous sheet or matrix 36 is temporarily sealed at its edges to a hood which is immersed in the furnish and to which the suction is applied. The corrugations serve to strengthen the filter unit and prevent its collapse. However, where the filter is to be subjected to relatively low pressures or where other supporting means are provided, the supporting sheet or matrix 36 may be flat or of other regular surface contour.

In Fig. 4 a further form of the filter unit is disclosed. In this construction the element, similarly as in Fig. 1, comprises a hollow body having foraminous walls formed of screen or perforated sheet material. The body is shaped to define a plurality of wings 40, the filtering mat being deposited over the entire area of the wings whereby the filtering area is greatly increased without corresponding increase of the diameter of the filtering unit. As will be understood, various other shapes may similarly be employed to increase the filtering area or to provide other special functions. Due to the manner in which the filtering mat is deposited from the wet furnish directly upon the matrix, adequate and uniform coverage of the matrix is obtained irrespective of its particular shape.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A filter for the removal of suspended particles from gases, said filter comprising a foraminous supporting member, a continuous mat of relatively fine mineral wool fibers with an interspersed binder in limited amount overlying said member and conforming to the surface contours thereof, and a substantially continuous mat of coarse mineral wool fibers overlying said first mat, the mats being interfelted at their zones of contact.

2. A method of making a filter unit comprising collecting a mat of mineral wool fibers and interspersed binder from an aqueous suspension thereof onto a foraminous surface of a hollow filter element by drawing air and water from the interior of said element while said element is immersed in said suspension, removing said element from said suspension and drying said mat on said element, said binder being present in a minor amount in said suspension to bind the fibers of the mat without excessively increasing its flow resistance.

3. A method of making a filter unit comprising immersing a hollow filter element including a foraminous surface area in a suspension of fine mineral wool fibers and a binder, withdrawing air and liquid from the interior of said element to cause collection of the fibers on the foraminous surface area thereof, immersing said element in a suspension of coarser mineral wool fibers and a binder, again withdrawing air and liquid from the interior of said element to cause collection of a mat of said coarser fibers on the mat of fibers first deposited, and drying the mats on said element.

4. A filter for the removal of particulate matter, said filter comprising a foraminous supporting member and a continuous, substantially uniform mat of wet felted mineral wool fibers and an interspersed binder in minor amount sufficient to bind the fibers of the mat without excessively increasing its low resistance overlying said member in closely adherent relationship thereto.

5. A filter for the removal of suspended particles from gases, said filter comprising a foraminous supporting member of uneven surface contour, and an interfelted mat of relatively fine mineral wool fibers and interspersed binder in minor amount sufficient to bind the fibers of the mat without excessively increasing its flow resistance overlying and conforming to the surface of the member.

PAUL F. McDERMOTT.

CERTIFICATE OF CORRECTION.

Patent No. 2,383,066.   August 21, 1945.

PAUL F. McDERMOTT.

It is hereby certified that error appears in the printed specification of the above numbered patent requiring correction as follows: Page 1, first column, line 43, for "interpersed" read --interspersed--; page 2, second column, line 37, for "beeen" read --been--; page 3, second column, line 32, claim 4, for "low" read --flow--; and that the said Letters Patent should be read with this correction therein that the same may conform to the record of the case in the Patent Office.

Signed and sealed this 4th day of December, A. D. 1945.

Leslie Frazer

First Assistant Commissioner of Patents.

(Seal)

matrix 36 is temporarily sealed at its edges to a hood which is immersed in the furnish and to which the suction is applied. The corrugations serve to strengthen the filter unit and prevent its collapse. However, where the filter is to be subjected to relatively low pressures or where other supporting means are provided, the supporting sheet or matrix 36 may be flat or of other regular surface contour.

In Fig. 4 a further form of the filter unit is disclosed. In this construction the element, similarly as in Fig. 1, comprises a hollow body having foraminous walls formed of screen or perforated sheet material. The body is shaped to define a plurality of wings 40, the filtering mat being deposited over the entire area of the wings whereby the filtering area is greatly increased without corresponding increase of the diameter of the filtering unit. As will be understood, various other shapes may similarly be employed to increase the filtering area or to provide other special functions. Due to the manner in which the filtering mat is deposited from the wet furnish directly upon the matrix, adequate and uniform coverage of the matrix is obtained irrespective of its particular shape.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A filter for the removal of suspended particles from gases, said filter comprising a foraminous supporting member, a continuous mat of relatively fine mineral wool fibers with an interspersed binder in limited amount overlying said member and conforming to the surface contours thereof, and a substantially continuous mat of coarse mineral wool fibers overlying said first mat, the mats being interfelted at their zones of contact.

2. A method of making a filter unit comprising collecting a mat of mineral wool fibers and interspersed binder from an aqueous suspension thereof onto a foraminous surface of a hollow filter element by drawing air and water from the interior of said element while said element is immersed in said suspension, removing said element from said suspension and drying said mat on said element, said binder being present in a minor amount in said suspension to bind the fibers of the mat without excessively increasing its flow resistance.

3. A method of making a filter unit comprising immersing a hollow filter element including a foraminous surface area in a suspension of fine mineral wool fibers and a binder, withdrawing air and liquid from the interior of said element to cause collection of the fibers on the foraminous surface area thereof, immersing said element in a suspension of coarser mineral wool fibers and a binder, again withdrawing air and liquid from the interior of said element to cause collection of a mat of said coarser fibers on the mat of fibers first deposited, and drying the mats on said element.

4. A filter for the removal of particulate matter, said filter comprising a foraminous supporting member and a continuous, substantially uniform mat of wet felted mineral wool fibers and an interspersed binder in minor amount sufficient to bind the fibers of the mat without excessively increasing its low resistance overlying said member in closely adherent relationship thereto.

5. A filter for the removal of suspended particles from gases, said filter comprising a foraminous supporting member of uneven surface contour, and an interfelted mat of relatively fine mineral wool fibers and interspersed binder in minor amount sufficient to bind the fibers of the mat without excessively increasing its flow resistance overlying and conforming to the surface of the member.

PAUL F. McDERMOTT.

---

CERTIFICATE OF CORRECTION.

Patent No. 2,383,066.   August 21, 1945.

PAUL F. McDERMOTT.

It is hereby certified that error appears in the printed specification of the above numbered patent requiring correction as follows: Page 1, first column, line 43, for "interpersed" read --interspersed--; page 2, second column, line 37, for "beeen" read --been--; page 3, second column, line 32, claim 4, for "low" read --flow--; and that the said Letters Patent should be read with this correction therein that the same may conform to the record of the case in the Patent Office.

Signed and sealed this 4th day of December, A. D. 1945.

Leslie Frazer (Seal)

First Assistant Commissioner of Patents.